United States Patent
Harris, Jr.

(10) Patent No.: US 10,467,702 B1
(45) Date of Patent: Nov. 5, 2019

(54) SYSTEM AND METHOD FOR A COLLABORATIVE PEER TO PEER MARKETPLACE

(71) Applicant: STATE FARM MUTUAL AUTOMOBILE INSURANCE COMPANY, Bloomington, IL (US)

(72) Inventor: Michael Harris, Jr., Normal, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 43 days.

(21) Appl. No.: 14/568,186

(22) Filed: Dec. 12, 2014

Related U.S. Application Data

(60) Provisional application No. 61/920,613, filed on Dec. 24, 2013.

(51) Int. Cl.
| | | |
|---|---|---|
| *G06Q 40/00* | (2012.01) | |
| *G06Q 40/08* | (2012.01) | |
| *G06Q 30/06* | (2012.01) | |

(52) U.S. Cl.
CPC ......... *G06Q 40/08* (2013.01); *G06Q 30/0645* (2013.01)

(58) Field of Classification Search
CPC .............................. G06Q 40/08; G06Q 40/00
See application file for complete search history.

(56) References Cited

U.S. PATENT DOCUMENTS

| 7,096,193 B1* | 8/2006 | Beaudoin | G06Q 10/06311 |
| | | | 705/26.1 |
| 7,966,329 B1* | 6/2011 | Rukonic | G06Q 40/02 |
| | | | 705/35 |
| 8,082,303 B2* | 12/2011 | Laroia | H04W 4/02 |
| | | | 709/204 |
| 2003/0084005 A1* | 5/2003 | Wong | G06Q 30/0283 |
| | | | 705/400 |
| 2003/0139948 A1* | 7/2003 | Strech | G06Q 40/00 |
| | | | 705/4 |
| 2004/0172304 A1* | 9/2004 | Joao | G06Q 40/02 |
| | | | 705/2 |

(Continued)

OTHER PUBLICATIONS

Abacus.net (https://www.abacus.net/programs/equipmentfloater, Sep. 13, 2007). (Year: 2007).*

(Continued)

*Primary Examiner* — Bruce I Ebersman
*Assistant Examiner* — Mark H Gaw
(74) *Attorney, Agent, or Firm* — Marshall, Gerstein & Borun LLP; Randall G. Rueth

(57) ABSTRACT

The method, system, and computer-readable medium facilitates a peer to peer marketplace created and maintained by an insurance provider. The provider enables sharing of goods and services among policyholders. A listing including a listing category for a good or service to be offered in the peer to peer marketplace can be received. An insurance policy quote to cover a rental transaction of the good or service offered in the listing can be generated, and both the listing and quote can be stored in a data repository. Next, a search category can be received, and one or more listings can be determined to be pertinent based on the search category. The determined pertinent listings can be presented and the rental transaction can be received.

14 Claims, 6 Drawing Sheets

(56) References Cited

U.S. PATENT DOCUMENTS

| | | | | |
|---|---|---|---|---|
| 2005/0114184 A1* | 5/2005 | Rock | ...................... | G06Q 40/02 |
| | | | | 705/4 |
| 2006/0184440 A1* | 8/2006 | Britti | ...................... | G06Q 40/00 |
| | | | | 705/35 |
| 2010/0241463 A1* | 9/2010 | Corben | ................. | G06Q 40/00 |
| | | | | 705/4 |
| 2011/0225047 A1* | 9/2011 | Breed | .................... | G06Q 30/02 |
| | | | | 705/14.55 |

OTHER PUBLICATIONS

Rental Equipment Procedures (https://www.nhcgov.com/wp-content/uploads/2014/06/Rental-Equipment-Procedures.pdf, Mar. 13, 1996.) (Year: 1996).*

NAIC ("Renters Insurance for College Students" NAIC, http://www.naic.org/documents/consumer_alert_renters.htm Sep. 28, 2006) (Year: 2006).*

* cited by examiner

SYSTEM AND METHOD FOR A COLLABORATIVE PEER TO PEER MARKETPLACE

CROSS REFERENCE TO RELATED APPLICATIONS

This application claims priority, under 35 U.S.C. § 119, to U.S. provisional patent application Ser. 61/920,613, entitled SYSTEM AND METHOD FOR COLLABORATIVE PEER TO PEER SHARING THROUGH AN INSURANCE PROVIDER, filed Dec. 24, 2013, the entire disclosure of which is incorporated herein in its entirety by reference thereto.

FIELD OF THE DISCLOSURE

This disclosure relates to a system and method for a collaborative peer marketplace supported by an insurance provider.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Big ticket items such as homes and specialty tools can be expensive and difficult to afford under a typical ownership model, especially if the item is used sparingly. To help finance ownership of such items, an owner may consider renting the item when it is not in use. Similarly, a person may want to supplement their income by providing a specialized service (tutoring, catering, etc.) for a cost. Currently, it may be difficult to complete such transactions in a secure manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One embodiment of the techniques of this disclosure is a computer-implemented method for creating and maintaining a collaborative peer to peer marketplace by an insurance provider. The method may include receiving, via a computer network, a listing including a listing category for a good or service to be offered in the peer to peer marketplace. The method may further include generating an insurance policy quote to cover a rental transaction of the good or service offered in the listing, wherein the insurance policy quote is generated by analyzing data related to the good or service offered in the listing, and wherein the insurance policy quote is included in the listing. The method may include storing, in a database in the computer network, the listing in a listing repository maintained by the insurance provider. Still further, the method may include receiving a search category related to the listing and determining one or more listings in the listing repository are pertinent to the received search category. The method may include presenting, via a user interface on a client device, the one or more determined pertinent listings. The method may include receiving the rental transaction of one or more of the determined pertinent listings, wherein an insurance coverage of the rental transaction is provided by the insurance provider and the insurance coverage is based on the generated insurance policy quote.

In other embodiments, a computer device may be implemented to create and maintain a collaborative peer to peer marketplace by an insurance provider. The computer device may comprise one or more processors and one or more memories coupled to the one or more processors. The one or more memories may include computer executable instructions stored therein that, when executed by the one or more processors, cause the one or more processors to perform a plurality of functions. For example, the instructions may cause the one or more processors to receive a listing including a listing category for a good or service to be offered in the peer to peer marketplace. The instructions may further cause the one or more processors to generate an insurance policy quote to cover a rental transaction of the good or service offered in the listing, wherein the insurance policy quote is generated by analyzing data related to the good or service offered in the listing, and wherein the insurance policy quote is included in the listing. The instructions may then cause the processors to store, in a database in the computer network, the listing in a listing repository maintained by the insurance provider. Still further, the instructions may cause the processors to receive a search category related to the listing and determining one or more listings in the listing repository are pertinent to the received search category. The instructions may then cause a function to present, via a user interface on a client device, the one or more determined pertinent listings. The instructions may then cause the one or more processors to receive the rental transaction of one or more of the determined pertinent listings, wherein an insurance coverage of the rental transaction is provided by the insurance provider and the insurance coverage is based on the generated insurance policy quote.

In still other embodiments, a tangible computer-readable medium may include non-transitory computer readable instructions stored thereon to create and maintain a collaborative peer to peer marketplace by an insurance provider. For example, the instructions may include receiving, via a computer network, a listing including a listing category for a good or service to be offered in the peer to peer marketplace. The instructions may further include generating an insurance policy quote to cover a rental transaction of the good or service offered in the listing, wherein the insurance policy quote is generated by analyzing data related to the good or service offered in the listing, and wherein the insurance policy quote is included in the listing. The instructions may include storing, in a database in the computer network, the listing in a listing repository maintained by the insurance provider. Still further, the instructions may include receiving a search category related to the listing and determining one or more listings in the listing repository are pertinent to the received search category. The instructions may include presenting, via a user interface on a client device, the one or more determined pertinent listings. The instructions may include receiving the rental transaction of one or more of the determined pertinent listings, wherein an insurance coverage of the rental transaction is provided by the insurance provider and the insurance coverage is based on the generated insurance policy quote.

The features and advantages described in this summary and the following detailed description are not all-inclusive. Many additional features and advantages will be apparent to one of ordinary skill in the art in view of the drawings, specification, and claims hereof.

DETAILED DESCRIPTION

A collaborative peer to peer (P2P) marketplace would provide an online network for users to do more with less by renting, lending, swapping, bartering, gifting and sharing products and services. In an embodiment disclosed herein, the P2P marketplace may be created and maintained by an insurance provider for use by insured customers (policyholders). The P2P marketplace would be a safe and trusted way for policyholders to experiment with P2P sharing. The marketplace would be overseen by an insurance provider with numerous services available including insurable transactions.

Users of the P2P marketplace could create listings to offer numerous goods and services to other users of the marketplace. The listings could fall in a number of categories such as home share, exchange and skill share. Users could also post wanted listings for goods and services that are not locally available.

A peer to peer marketplace could be a valuable resource to many insurance customers, such as first time home buyers, young professionals, and recent college graduates. The P2P marketplace could provide access to goods and services which are not easily available. Users may also benefit from the P2P marketplace by generating income through renting, exchanging and sharing goods and services with other policyholders. Because the network is created and maintained by an insurance provider, the P2P marketplace would have the added benefit of insurable transactions, which in turn, would lead to lower cost for renting.

Figure 1:
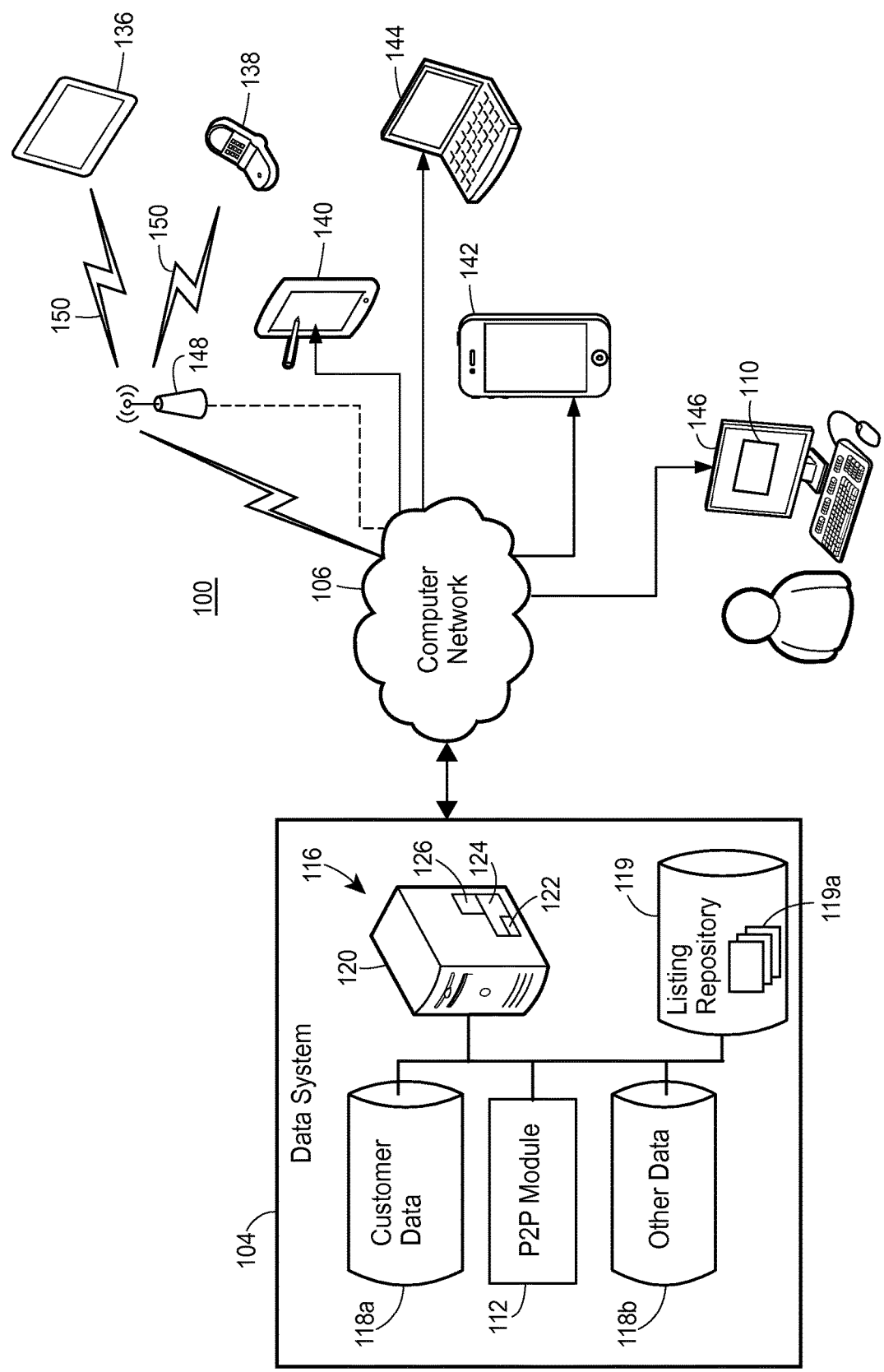
FIG. 1 is a simplified and exemplary block diagram of a system for creating and maintaining a collaborative peer to peer marketplace.

FIG. 1 generally illustrates one embodiment for a system 100 to create and maintain a collaborative peer to peer marketplace. The system 100 includes hardware and software applications, as well as various data communication channels for facilitating data communications between the various hardware and software components. The system 100 may include clients 136, 138, 140, 142, 144 and 146 as front end components and backend components 104 in communication with each other via a communication link 106 (e.g., computer network, internet connection, etc.).

FIG. 1 illustrates a block diagram of a high-level architecture of a collaborative peer to peer marketplace system 100 including various software or computer-executable instructions and hardware components or modules that may employ the software and instructions to create and maintain a peer to peer marketplace. The various modules may be implemented as computer-readable storage memories containing computer-readable instructions (i.e., software) for execution by a processor of the computer system 100. The modules may perform the various tasks associated with creating and maintaining listings for a collaborative peer to peer marketplace, as herein described. The computer system 100 also includes both hardware and software applications, as well as various data communications channels for communicating data between the various hardware and software components.

The client devices 136-146 may include, by way of example, a tablet computer 136, a cell phone 138, a personal digital assistant (PDA) 140, a mobile device smart-phone 142 also referred to herein as a "mobile device," a laptop computer 144, a desktop computer 146, a portable media player (not shown), a wearable computing device (not shown), smart watches, phablets, other smart devices, devices configured for wired or wireless RF (Radio Frequency) communication, etc. Of course, any client device appropriately configured may interact with peer to peer marketplace system 100. The client devices 136-146 need not necessarily communicate with the network 106 via a wired connection. In some instances, the client devices 136-146 may communicate with the network 106 via wireless signals 150 and, in some instances, may communicate with the network 106 via an intervening wireless and/or wired device 148, which may be a wireless router, a wireless repeater, a base transceiver station of a mobile telephone provider, etc.

Each of the client devices 136-146 may interact with the data system 116 to receive web pages and/or server data from the server 120 and may display the web pages and/or server data via a client application and/or an Internet browser (described below). For example, the mobile device 142 may display a listing 119a through a client application and/or through a web page to a user, may receive an input from the user, and may interact with the data system 116. It will be appreciated that although only one server 120 is depicted in FIG. 1, multiple servers 120 may be provided for the purpose of distributing server load, serving different web pages, etc. These multiple servers 120 may include a web server, an entity-specific server (e.g. an Apple® server, etc.), a server that is disposed in a retail and/or proprietary network, etc.

The P2P module 112 may create listings 119a and cause the listings 119a to be stored in a listing repository 119. Generally, each listing 119a is a data structure defining a good or service to be exchanged in the peer to peer marketplace and the data structure includes a plurality of data to be presented to the user. Generally, listings include various data (such as rental cost, category, location, etc.) which may be received through client devices 136-146 and through customer data 118a and other data 118b.

The client may contain a GUI 110 which may communicate with the system 116 through the network 106 or other type of suitable network (local area network (LAN), a metropolitan area network (MAN), a wide area network (WAN), a mobile, a wired or wireless network, a private network, a virtual private network, etc.). The digital network 106 may be a proprietary network, a secure public Internet, a virtual private network and/or some other type of network, such as dedicated access lines, plain ordinary telephone lines, satellite links, combinations of these, etc. Where the digital network 106 comprises the Internet, data communication may take place over the digital network 106 via an Internet communication protocol.

A system server 120 may send and receive information and data 118a, 118b, 119 for the system 100 such as computer-executable instructions and data associated with applications executing on the clients 136-146 (e.g., the P2P module 112). The applications executing within the system 100 may include cloud-based applications, web-based interfaces to the data system 116, software applications executing on the clients, or applications including instructions that are executed and/or stored within any component of the system 100. The applications, GUI 110, browser, and module 112 may be stored in various locations including separate repositories and physical locations.

In some embodiments, the data system 116 in general and the server 120 in particular may include computer-executable instructions 122 stored within a memory 124 of the server 120 and executed using a processor 126. The instructions 122 may instantiate a P2P module 112 or send instructions to the clients 136-146 to instantiate a GUI 110 for the tool 112 using a web browser application of a client. In some embodiments, the browser application, GUI 110, P2P module 112, and elements of the data system 116 may be implemented at least partially on the server 120 or clients 136-146. The data system 116 and processor 126 may execute instructions 122 to display the GUI 110 including the data 118a, 118b, 119 within a display of the clients 136-146 or server 120 (not shown). For simplicity, only one GUI 110 is provided in the exemplary system 100, although this is not intended to limit the number and/or location of the GUI 110.

The P2P module 112 may include the functionality of a camera, or have access to camera functionality of the client devices 136-146. Thus, the module 112 may be able to take a digital photo or digital video of an item to obtain data for creating listings. The module 112 may also receive an image of an item from the memory of the client devices 136-146.

The P2P module 112 may include various instructions for execution by a processor 126 to create and maintain listings 119a. For example, the module 112 may create listings 119a by analyzing data obtained from an image of an item along with customer data 118a, other data 118b, and data from the listing repository 119. Further, the P2P module 112 may implement optical character recognition (OCR) technology to obtain data from the image of an item.

The P2P module 112 may then present the one or more created listings 119a. In response to presenting the one or more created listings 119a, the module may receive an indication that one of the presented listings 119a is to be rented. If a listing is rented the P2P module 112 may complete the transaction and notify both users of a completed transaction.

In an aspect, the module 112 may be a client application that may be implemented as a series of machine-readable instructions for performing the various tasks associated with implementing the collaborative peer to peer marketplace system 100 as well as receiving information, displaying information, and/or transmitting information between devices 136-146 and server 120.

In various aspects, the module 112 may be implemented as a stand-alone system or as a system wherein the front-end components 136-146 communicate with back-end components 104 as described herein. Additionally, the module 112 may include machine-readable instruction for implementing a user interface to allow a user to input commands to and receive information from the collaborative peer to peer marketplace system 100 in accordance with the functionality supported by the module 112.

The module 112 may be a native web browser, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server 120 or other back-end components 104 while also receiving inputs from the user. The module 112 may include an embedded web browser that may be implemented as a series of machine-readable instructions for receiving, interpreting, and displaying web page information from the servers 120 or other back-end components 104 within client devices 136-146.

In an aspect, module 112 may be an application that is installed on devices 136-146. For example, the dynamic policy module 112 may be downloaded and installed to device 142 by a user. In an aspect, module 112 may include instructions for implementing a user interface to allow a user to input commands and/or respond to prompts. For example, module may allow a user to input customer data (name, address, etc.) or a user login, take and submit pictures of an item, input other information regarding a good or service for a listing, receive rental transactions, etc.

Figure 2:
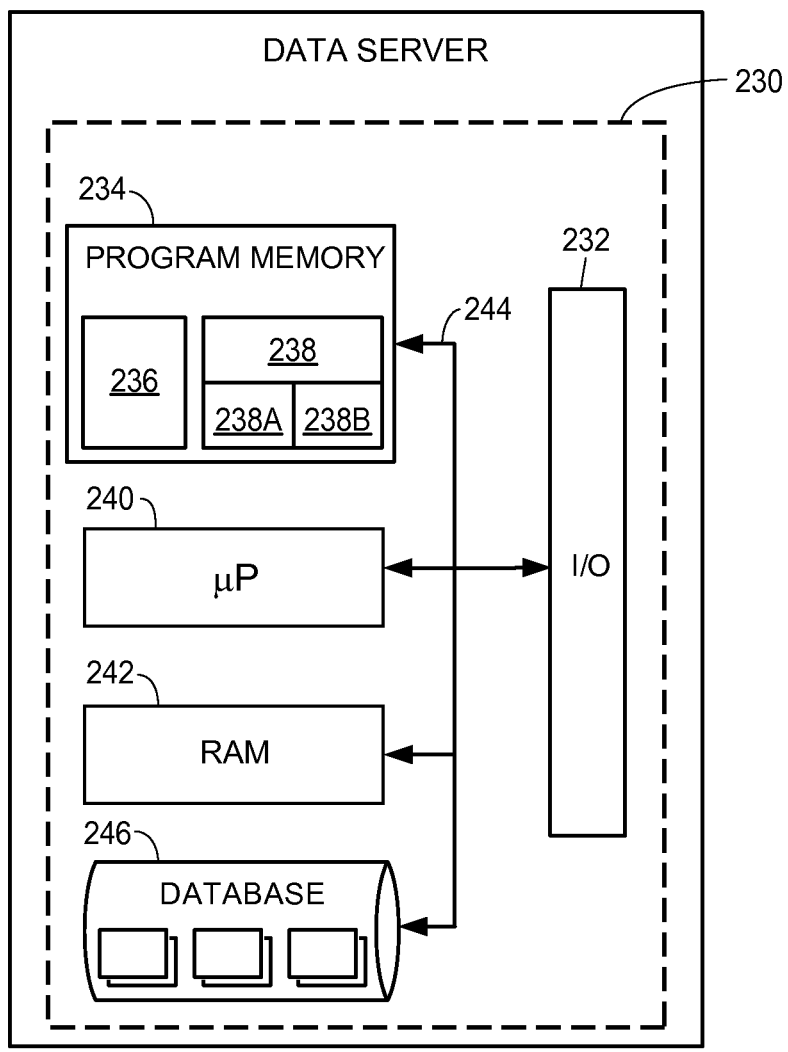
FIG. 2. is an exemplary architecture of a server of a system for creating and maintaining a collaborative peer to peer marketplace.

Referring now to FIG. 2, a data server 120 includes a controller 230. The controller 230 includes a program memory 234, a microcontroller or a microprocessor (μP) 240, a random-access memory (RAM) 242, and an input/output (I/O) circuit 232, all of which are interconnected via an address/data bus 244. The program memory 234 may store computer-executable instructions, which may be executed by the microprocessor 240. In some embodiments, the controller 230 may also include, or otherwise be communicatively connected to, a database 246 or other data storage mechanism (one or more hard disk drives, optical storage drives, solid state storage devices, etc.). The database 246 may include data such as customer data, listings, etc. It should be appreciated that although FIG. 2 depicts only one microprocessor 240, the controller 230 may include multiple microprocessors 240. Similarly, the memory 234 of the controller 230 may include multiple RAMs 236 and multiple program memories 238, 238A and 238B storing one or more corresponding server application modules, according to the controller's particular configuration.

Although FIG. 2 depicts the I/O circuit 232 as a single block, the I/O circuit 232 may include a number of different types of I/O circuits (not depicted), including but not limited to, additional load balancing equipment, firewalls, etc. The RAM(s) 236, 242 and the program memories 238, 238A and 238B may be implemented in a known form of computer storage media, including but not limited to, semiconductor memories, magnetically readable memories, and/or optically readable memories, for example, but does not include transitory media such as carrier waves.

Figure 3A:
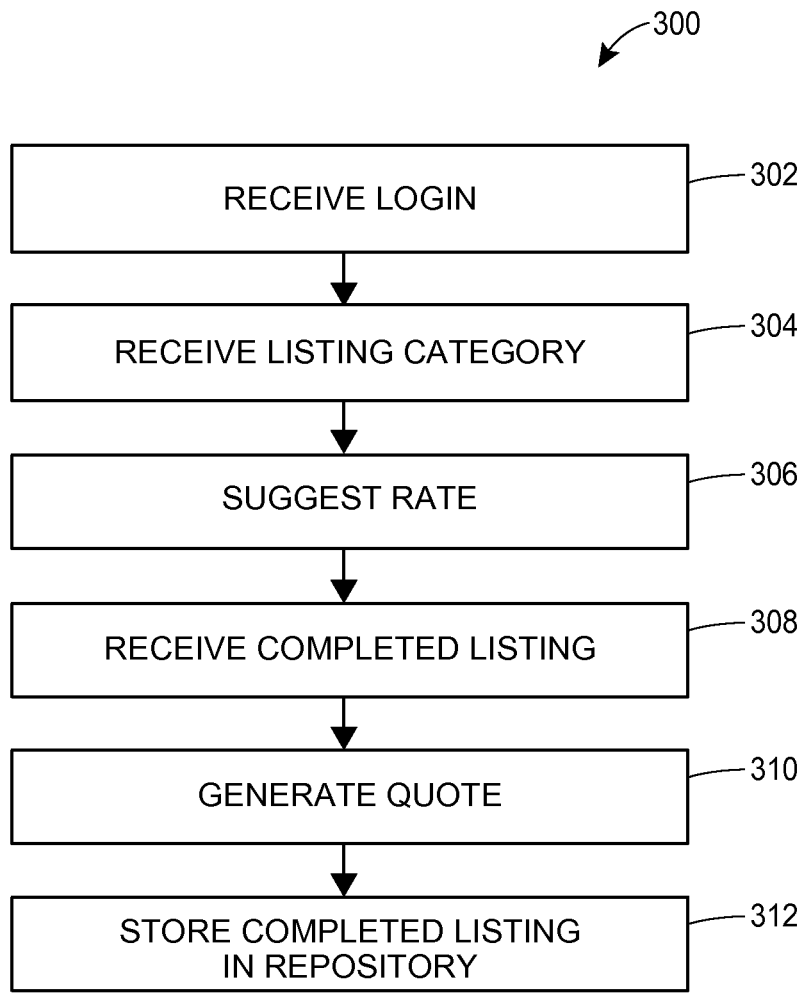
FIG. 3a is a flowchart illustrating an exemplary method for creating listings for a collaborative peer to peer marketplace.

With reference to FIG. 3a, the system 100 described herein may be employed in a method 300 to receive and create listings for the peer to peer marketplace. The method 300 (as well as method 350 discussed below) may include one or more functions or routines in the form of non-transitory computer-executable instructions that are stored in a tangible computer-readable storage medium and executed using a processor of a computing device (e.g., the clients 136-146, the server 120, or any combination of computing devices within the system 100). The routines may be included as part of any of the modules described in relation to FIG. 1 above, or FIG. 5 below, or as part of a module that is external to the system illustrated by FIGS. 1 and 5. For example, the method 300 may be part of a browser application or another application running on the clients 136-146 as a plugin or other module of the browser application.

The method 300 may begin after the system 100 receives a customer login (Block 302). By logging in, the user may access a profile in the customer database 118a, which can then be associated with any listings the user submits. In an embodiment, the system may receive a unique login ID and password to access a customer profile. In another embodiment the user may implement a fingerprint scanner, an ID scanner or a magnetic swipe card to login to the system. In yet another embodiment, the user may implement a user interface of a client device to input user data into a profile if the customer does not exist in the database 118a. Customer data 118a may also store a "star rating" in each customer profile, which acts as a feedback score to rate previous transactions.

Once a login is received and a profile is identified, any listings received may be associated with the identified profile. In an embodiment, all profiles in the customer database 118a are associated with customers (policyholders) of the insurance provider. In another embodiment, profiles in the database 118a are associated to registered users which do not have to be customers of an insurance provider. A profile in the database 118a may include demographic information to identify a customer such as name, address, date of birth, social security number, etc.

After identifying a profile, the system may then receive a listing category (Block 304). A listing category identifies what type of good or service the listing will relate to. Example categories include home share, exchange and skill share. Future embodiments are not limited by the categories currently listed, and can be expanded or amended by the provider of the peer to peer marketplace.

A home share may include sharing a home or other owned property such as an apartment, a mobile home, etc. Listings in the home share category would typically include details such as rental price, duration, address and any other information that might be useful to a customer looking to rent a home or dwelling. A rental transaction in the home share category could also include property insurance for the owner and rental insurance for the renter. In an embodiment, the home share category may be expanded to include a connected community category which would consist of communities offering affordable and prefabricated dwellings and shared living spaces.

Listings in the exchange category may include household goods to be rented. For example, a user may want to generate income by renting a power tool that they are not currently using. This may also be an item that is beneficial for someone to rent because it may not be used frequently enough to require ownership. The P2P module 112 may offer insurance coverage of rental transactions in the exchange category. Although these items may not typically be insured, the P2P module may use data from customer data 118a, other data 118b and listing data from the repository 119 to generate quotes for insuring such items.

The skill share category would include listings that relate to services available for rent. For example, a customer that is a chef may offer catering services. As with the exchange category, the module 112 may use available data to generate insurance quotes for transactions in this category. Skill share listings may provide skilled workers an avenue to offer their services in a insured transaction, while also offering those in need a medium to safely employ a skilled person for a competitive price.

In an embodiment the system may receive the listing category through a user interface of a client device. The system may receive a text description of the category which the module 112 may use to identify the good or service and subsequently a category. The system may also receive a photo or video of an item which the module 112 may use to identify a category. In another embodiment the system may receive an audio description for the module 112 to decipher. In yet another embodiment the system may receive a scan of a UPC, barcode or QR code for the module 112 to read to determine an item and category.

Once a category has been identified, the system may analyze data in the user data 118a, other data 118b and repository 119 to generate suggested rental rates for an item to be presented to a user via a client device (Block 306). A suggested rate may help a customer price the item in the listing. The module 112 may use any of the various accessible data to calculate a suggested rate. In an embodiment, the module 112 may search for similar items in the repository 119 to calculate a suggested rate. In another embodiment, the module 112 may analyze demographic data in the customer data 118a to determine a suggested rate for the listing.

The system may then receive the completed listing (Block 308). The completed listing may include the details necessary to facilitate a rental transaction. In an embodiment, the module 112 may receive and process a photo, a video, or an audio file to extract information to complete a listing. For example, the module 112 may receive a photo of a lawn mower and use the photo along with information gathered from customer data 118a, other data 118b and the repository 119 to complete a listing. In another embodiment, the module 112 may receive data input through a user interface of a client device to receive data for a completed listing. A completed listing is discussed in more detail below in the example listing provided in FIG. 4.

After the information is received for a complete listing, the system may generate an insurance quote for the listing (Block 310). The module 112 may analyze any relevant information in the complete listing and customer data 118a, other data 118b and repository data 119 when calculating an insurance quote to cover the rental transaction for the service or good in the listing. In an embodiment, the P2P module 112 may generate two insurance quotes for a listing, one for the owner and one for the renter. In another embodiment, the module 112 may generate an insurance quote that may be deducted from the amount of money that the owner receives from a rental transaction.

In an embodiment, the module 112 may generate insurance quotes with variable coverage that depends on the good or service in the listing. The module 112 may generate the coverage based on the good or service to be insured in the listing (including variables such as deductible, total coverage, etc.). In another embodiment, the coverage of the generated quote may be edited by the owner. In turn, the module 112 will calculate a new quote based on the coverage selected by the owner.

The system may then store the completed listing, including a quote for insuring the transaction (Block 312). The completed listing 119a may be stored in the data repository 119.

Figure 3B:
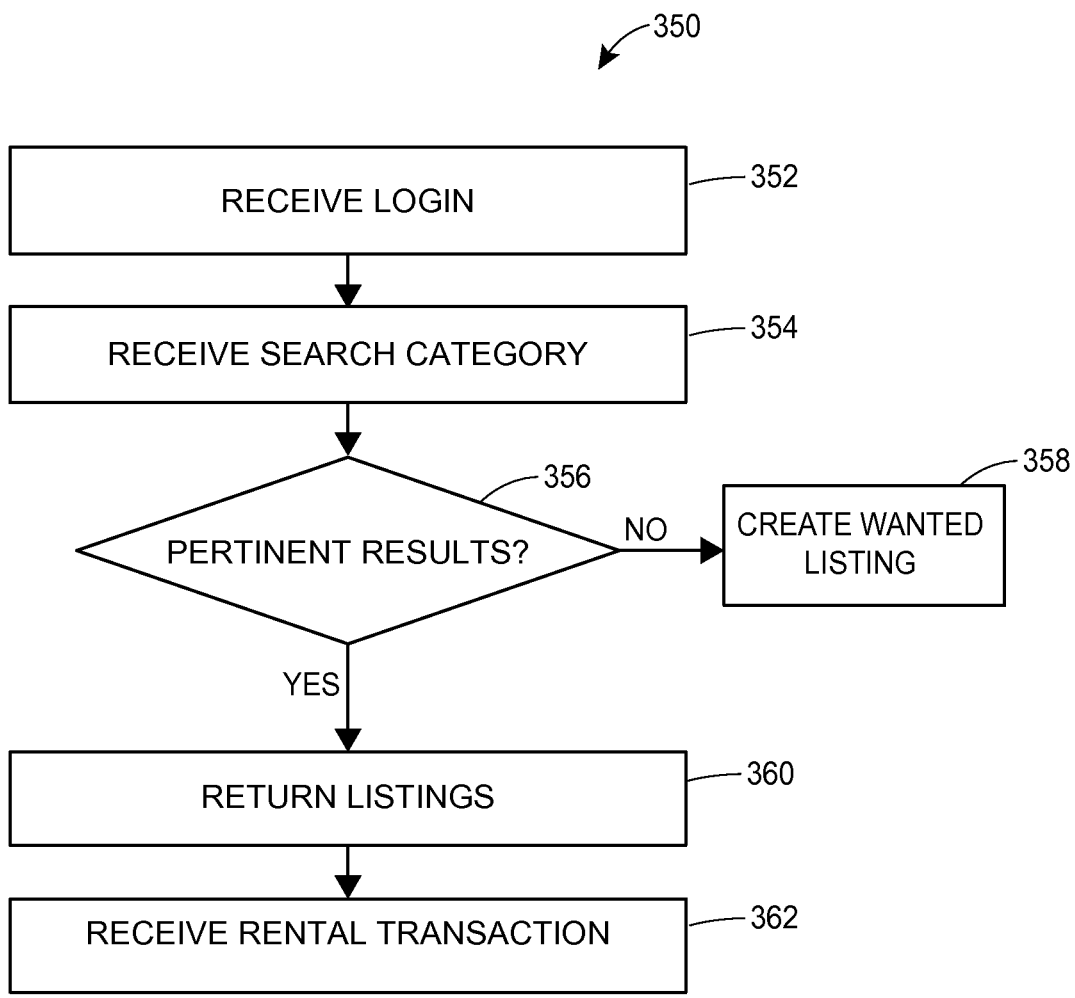
FIG. 3b is a flowchart illustrating an exemplary method for searching and creating listings and completing rental transactions in a collaborative peer to peer marketplace.

The collaborative peer to peer marketplace system 100 may further be deployed in the method 350 of FIG. 3b. The method 350 may begin by receiving a login (Block 352). The login process may be similar to the login discussed above with respect to Block 302 of method 300.

Once a login is received, the system may then receive a search category (Block 354). The search category may be received by any means described above with respect to receiving a listing category in Block 304 or method 300. The system may use the received search category along with any necessary information from the customer data 118a associated with the received login to determine if any pertinent listings 119a are currently in the repository 119 (Block 356).

The module 112 may determine if a listing is pertinent based on the customer data 118a and the received search category. For example, the customer data 118a includes demographic information, such as location, that the module 112 uses to determine if a listing is pertinent. If a good or service is located at a distance that is determined to be too far from the location in the customer data 118a, then the listing cannot be considered pertinent. The module 112 can employ the search category in a similar manner to determine listing pertinence.

If the system determines that there are no pertinent listings in the repository, the system may then create a wanted listing (Block 358). A wanted listing may be created in a manner similar to creating a listing described above in Blocks 308-312. A wanted listing can yield a completed rental transaction much like a listing, however the difference is that in a wanted listing an owner must agree to provide the good or service as required by the renter in the wanted listing.

If the system determines that there are pertinent listings in the repository, the system may return the pertinent listings (Block 360). The system may employ the module 112 to present the listings 119a via a user interface of a client device. A user of the system may then employ the client device to browse the pertinent listings and determine if they would like to complete a rental transaction for the goods or services in any of the listings. If a user is not satisfied with the returned pertinent listings, the user may create a wanted listing as described above.

The system may then complete a rental transaction (Block 362). The completed transaction is insured by the insurance provider which maintains the collaborative peer to peer marketplace. The module 112 may generate an email or other message to contact both the owner and renter upon receiving a rental transaction. A complete transaction may be a binding contract with terms and conditions as provided in the listings. An owner is obligated to provide the good or service from the listing to the renter until the rental transaction is complete. Similarly, a renter is obligated to complete payment for the good or service as stipulated in the listing.

Figure 4:
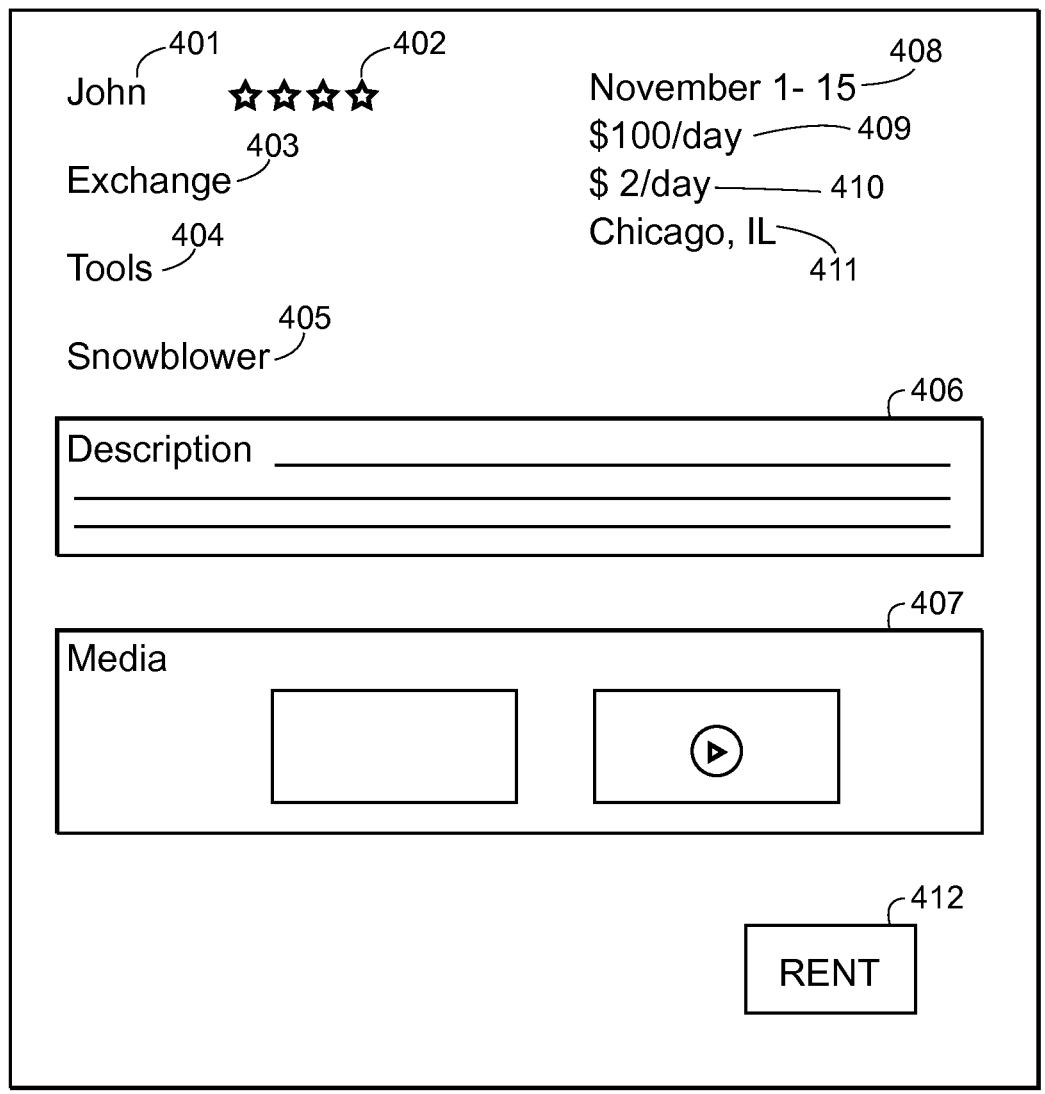
FIG. 4 is an illustration of an example user interface displaying a listing for the collaborative peer to peer marketplace.

FIG. 4 is an illustration of an exemplary interface 400 displaying a listing 119a for the collaborative peer to peer marketplace. The listing 119a may include features such as a username 401 including a star rating associated with the username. Depending on the embodiment, the username 401 may be a user's real name or a username created for the peer to peer marketplace. The star rating 402 is associated with the username 401 and both can be accessed by the login as described above. The username 401 and star rating 402 may be stored in the customer data 118a.

The listing 119a can also include a category 403 as discussed above. In an embodiment the category 403 can be one of a home share, an exchange or a skill share. In other embodiments more of fewer categories 403 can be implemented. A subcategory 404 can also be included in a listing. In the example listing 119a of the interface 400, the subcategory is a tool.

The listing 119a may also include the name of the item 405. The item 405 can be a general name given to a produce, or a trademarked name from the manufacturer. A description 406, may also provide information for the listing 119a. The description 406 may describe terms and conditions for the rental. The description 406 may also provide details about the particular good or service for rent in the listing 119a.

The listing may also include media 407. The media can be a picture or video of the good or service offered for rent in the listing 119a. The media can also include audio, if perhaps the good or service in the listing 119a is related to audio equipment, for example. The media can be received by the P2P module 112 through input from the client devices 136-146.

The listing 119a may also include information necessary to complete a rental transaction such as availability 408, rental cost 409, insurance cost 410 and location 411. Availability 408 can be a range of times and dates when the good or service is available for rent. The rental cost 409 and insurance cost 410 is the amount a user must pay to rent the good or service in the listing, and can be a daily, hourly, weekly or monthly rate. The location 411 can indicate where the good or service of the listing is located and can be a determining factor in whether a listing is pertinent. If a listing location 411 is too far from a user, the user may not be interested in renting the good or service of the listing 119a.

The interface 400 may also include an icon 412 to receive an indication that a rental transaction is to be completed. The indication may be received through a click or touch of the icon 412 via the interface 400 being display on the client device.

Figure 5:
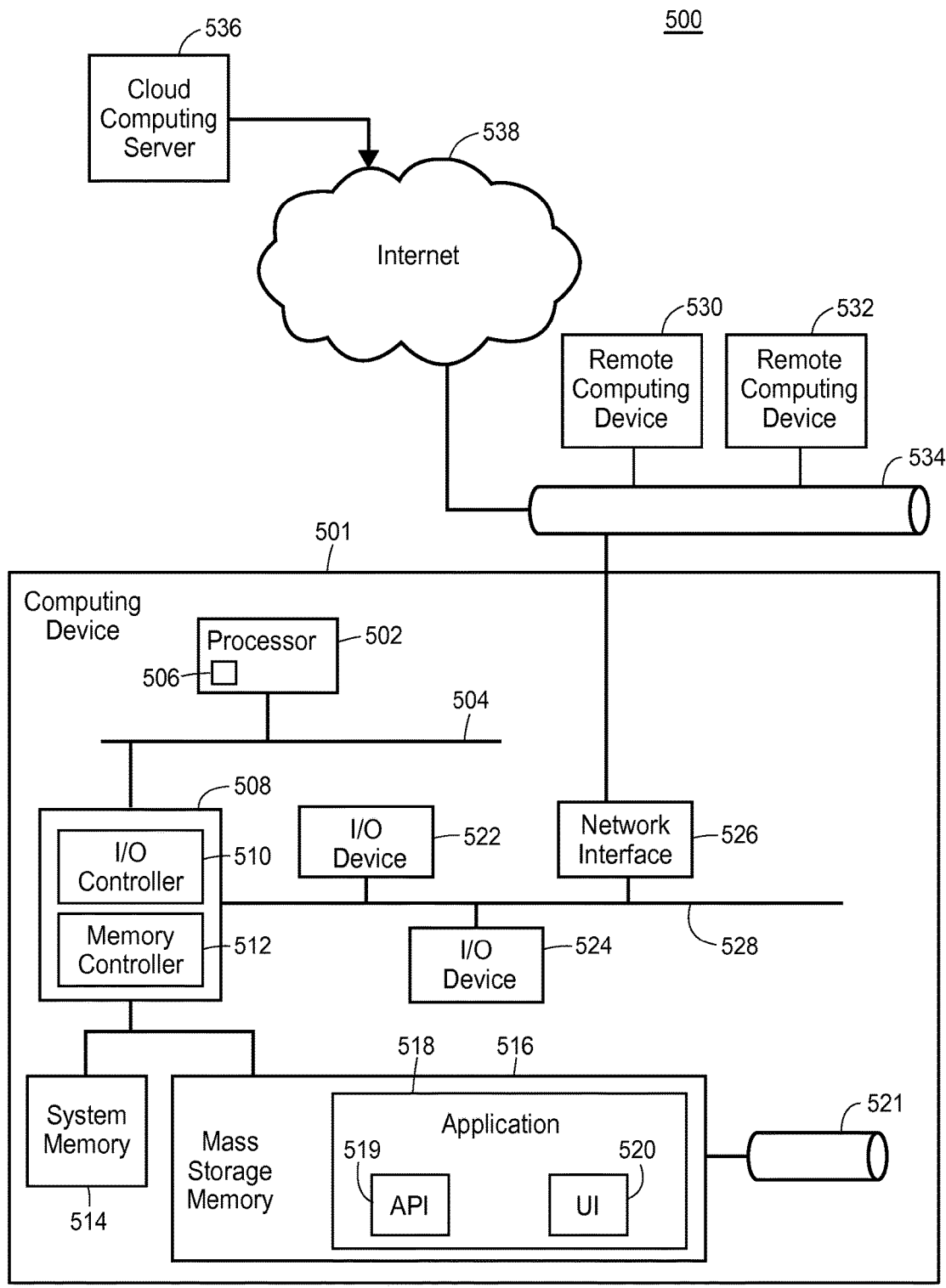
FIG. 5 illustrates a block diagram of a computer to implement the various user interfaces, methods, functions, etc., for creating and maintaining a collaborative peer to peer marketplace in accordance with the described embodiments

FIG. 5 illustrates an exemplary computing environment for implementing the system 100 and methods 300 and 350, as described herein. As shown in FIG. 5, the computing device 501 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the computing device 501 may be a multi-processor device and, thus, may include one or more additional processors that are identical or similar to the processor 502 and that are communicatively coupled to the interconnection bus 504.

The processor 502 of FIG. 5 is coupled to a chipset 508, which includes a memory controller 512 and a peripheral input/output (I/O) controller 510. As is well known, a chipset typically provides I/O and memory management functions as well as a plurality of general purpose and/or special purpose registers, timers, etc. that are accessible or used by one or more processors coupled to the chipset 508. The memory controller 512 performs functions that enable the processor 502 (or processors if there are multiple processors) to access a system memory 514 and a mass storage memory 516.

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the computing device 501 is used to implement a P2P Module 518 having an API 519 (including functions and instructions as described by the methods 300 and 350 of FIGS. 3a and 3b), and user interface 520 to receive user input, the mass storage memory 516 may include a hard disk drive, an optical drive, a tape storage device, a solid-state memory (a flash memory, a RAM memory, etc.), a magnetic memory (e.g., a hard drive), or any other memory suitable for mass storage. In one embodiment, non-transitory program functions, modules and routines (an application 518, an API 519, and the user interface 520, etc.) are stored in mass storage memory 516, loaded into system memory 514, and executed by a processor 502 or can be provided from computer program products that are stored in tangible computer-readable storage mediums (RAM, hard disk, optical/magnetic media, etc.). Mass storage 516 may also include a cache memory 521 storing application data, user profile data, and timestamp data corresponding to the application data, and other data for use by the application 518.

The peripheral I/O controller 510 performs functions that enable the processor 502 to communicate with peripheral input/output (I/O) devices 522 and 524, a network interface 526, via a peripheral I/O bus 528. The I/O devices 522 and 524 may be any desired type of I/O device such as a keyboard, a display (a liquid crystal display (LCD), a cathode ray tube (CRT) display, etc.), a navigation device (a mouse, a trackball, a capacitive touch pad, a joystick, etc.), etc. The I/O devices 522 and 524 may be used with the application 518 to provide a peer to peer marketplace for rental transactions as described in relation to the figures. The local network transceiver 528 may include support for Wi-Fi network, Bluetooth, Infrared, cellular, or other wireless data transmission protocols. In other embodiments, one element may simultaneously support each of the various wireless protocols employed by the computing device 501. For example, a software-defined radio may be able to support multiple protocols via downloadable instructions. In operation, the computing device 501 may be able to periodically poll for visible wireless network transmitters (both cellular and local network) on a periodic basis. Such polling may be possible even while normal wireless traffic is being supported on the computing device 501. The network interface 526 may be an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 512 and the I/O controller 510 are depicted in FIG. 5 as separate functional blocks within the chipset 508, the functions performed by these blocks may be integrated within a single integrated circuit or may be implemented using two or more separate integrated circuits. The system 500 may also implement the user interface 400 and P2P module 112 on remote computing devices 530 and 532. The remote computing devices 530 and 532 may communicate with the computing device 501 over a network link 534. For example, the computing device 501 may receive listings 119a created by an application executing on a remote computing device 530, 532. In some embodiments, the application 518 including the user interface 400 and module 112 may be retrieved by the computing device 501 from a cloud computing server 536 via the Internet 538. When using the cloud computing server 536, the retrieved application 518 may be programmatically linked with the computing device 501. The application 518 may be a Java® applet executing within a Java® Virtual Machine (JVM) environment resident in the computing device 501 or the remote computing devices 530, 532. The application 518 may also be "plug-ins" adapted to execute in a web-browser located on the computing devices 501, 530, and 532. In some embodiments, the application 518 may communicate with backend components 540 such as the data system 104 via the Internet 538 or other type of network.

Using the system 100 and methods 300 and 350 described herein, a P2P module 112 coupled with the methods 300 and 350 may implement a peer to peer marketplace to better service, retain, and expand a customers of an insurance provider. By providing a collaborative peer to peer marketplace to policyholders, the insurance provider can help customers by providing goods and services which may not normally be available. The peer to peer marketplace can also provide an added avenue for sales to the insurance provider by having transactions insured by the provider.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 106, may include but is not limited to any combination of a LAN, a MAN, a WAN, a mobile, a wired or wireless network, a private network, or a virtual private network. Moreover, it is understood that any number of client computers or display devices are supported and can be in communication with the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for creating and maintaining a collaborative peer to peer marketplace through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for creating and maintaining a collaborative peer to peer marketplace by an insurance provider, the method comprising:
    implementing a peer-to-peer (P2P) policy module as software as a service (SaaS) on one or more processors, the P2P module implemented at least partially on a back-end server and at least partially on one or more smart phones, the P2P module including an application programming interface (API) portion executing on the back-end server, and the P2P module further including a client portion executing on the one or more smart phones, wherein the client portion accesses the back-end server via the API portion through a computer network;
    receiving, via a computer network from the client portion of the P2P module from a first client device, media in the form of a photo, a video or an audio file;
    generating, by executing instructions of the P2P module via the one or more processors of the back-end server, a listing for a household good or service to be offered for rent in the peer to peer marketplace based on information extracted from the received media and other data, wherein the household good or service does not include a vehicle or a dwelling, wherein the listing includes a rental cost, a category, a length of rental including dates of availability, and one or more of (i) a name of the household good or service for rent, (ii) a description of the household good or service for rent, (iii) media related to the household good or service for rent, (iv) a location of the household good or service for rent, or (v) a subcategory, and wherein the listing category can be one of an exchange or a skill share;
    generating, by executing instructions of the P2P module via the one or more processors of the back-end server, an insurance policy quote for an insurance policy to cover a rental transaction of the household good or service offered in the listing, wherein generating the insurance policy quote includes:
        analyzing data related to the household good or service offered in the listing,
        comparing the received listing to one or more similar listings in a listing repository maintained by the insurance provider, wherein the one or more similar listings are for similar same household goods or services as the household good or service from the received listing, and
        automatically deducting the insurance policy from the rental cost of the listing;
    storing, in a database communicatively coupled to the P2P module of the back-end server, the listing in the listing repository maintained by the insurance provider;
    receiving, via a computer network from the client portion of the P2P module from a second client device, a search category;
    determining, by the P2P module via the one or more processors of the back-end server, one or more listings in the listing repository are pertinent by: (i) comparing a location of the second client device to the location of the household good or service for rent of each of the one more listings, and (ii) comparing the category of each listing to the received search category;
    presenting, via a user interface on the client portion of the P2P module on the second client device, the one or more determined pertinent listings;
    receiving, via the user interface on the client portion of the P2P module from the second client device, the rental transaction of one or more of the determined pertinent listings, wherein receiving the rental transaction includes receiving a payment of the rental cost which includes the cost of the insurance policy to cover the rental transaction, wherein the insurance policy of the rental transaction is provided by the insurance provider; and
    automatically sending a notification of the rental transaction including a payment to the client portion of the P2P module on the first client device.

2. The computer-implemented method of claim 1, wherein the listing further includes a username or a star rating, and wherein the media related to the household good or service for rent includes one or more of a photo, a video, or an audio file.

3. The computer-implemented method of claim 1, wherein a listing can be a wanted listing.

4. The computer-implemented method of claim 1, further comprising receiving, via a computer network from the client portion of the P2P module from the first client device, a login to identify a customer profile to be associated with the listing.

5. The computer-implemented method of claim 1, wherein the P2P module is installed as part of an application on the one or more smartphones.

6. A collaborative peer to peer market system, the system comprising:
    a back-end server; and
    a peer-to-peer (P2P) module implemented as software as a service (SaaS) and configured to execute on one or more processors, the P2P module configured to execute at least partially on the back-end server and at least partially on one or more smart phones, the P2P module including an application programming interface (API) portion configured to execute on the back-end server, and the P2P module further including a client portion configured to execute on the one or more smart phones, wherein the client portion is configured to access the back-end server via the API portion through a computer network, the P2P module configured to:

receive, from the client portion of the P2P module from a first client device, media in the form of a photo, a video or an audio file;

generate a listing for a household good or service to be offered for rent in the peer to peer marketplace based on information extracted from the received media and other data, wherein the household good or service does not include a vehicle or a dwelling, wherein the listing includes a rental cost, a category, a length of rental including dates of availability, and one or more of (i) a name of the household good or service for rent, (ii) a description of the household good or service for rent, (iii) media related to the household good or service for rent, (iv) a location of the household good or service for rent, or (v) a subcategory, and wherein the listing category can be one of an exchange or a skill share;

generate an insurance policy quote for an insurance policy to cover a rental transaction of the household good or service offered in the listing, wherein generating the insurance policy quote includes:
  analyzing data related to the household good or service offered in the listing,
  comparing the received listing to one or more similar listings in a listing repository maintained by the insurance provider, wherein the one or more similar listings are for similar household goods or services as the household good or service from the received listing, and
  automatically deducting the insurance policy from the rental cost of the listing;

store the listing in the listing repository maintained by the insurance provider communicatively coupled to the P2P module on the back-end server;

receive from the client portion of the P2P module from a second client device a search category;

determine one or more listings in the listing repository are pertinent by: (i) comparing a location of the second client device to the location of the household good or service for rent of each of the one more listings, and (ii) comparing the category of each listing to the received search category;

present, via a user interface on the client portion of the P2P module on the second client device, the one or more determined pertinent listings;

receive the rental transaction of one or more of the determined pertinent listings from the client portion of the P2P module on the second client device, wherein receiving the rental transaction includes receiving a payment of the rental cost which includes the cost of the insurance policy to cover the rental transaction, wherein the insurance policy of the rental transaction is provided by the insurance provider; and automatically send a notification of the rental transaction including a payment to the client portion of the P2P module on the first client device.

7. The computer-system of claim 6, wherein the listing further includes a username or a star rating, and wherein the media related to the household good or service for rent includes one or more of a photo, a video, or an audio file.

8. The computer-system of claim 6, wherein a listing can be a wanted listing.

9. The computer-system of claim 6, further comprising receiving, via a computer network from the client portion of the P2P module from the first client device, a login to identify a customer profile to be associated with the listing.

10. The computer-system of claim 6, wherein the P2P module is installed as part of an application on the one or more smartphones.

11. A tangible computer-readable medium including non-transitory computer readable instructions stored thereon for creating and maintaining a collaborative peer to peer market place by an insurance provider, the instructions to:

implement a peer-to-peer (P2P) module implemented as software as a service (SaaS) and configured to execute on one or more processors, the P2P module configured to execute at least partially on a back-end server and at least partially on one or more smart phones, the P2P module including an application programming interface (API) portion configured to execute on the back-end server, and the P2P module further including a client portion configured to execute on the one or more smart phones, wherein the client portion is configured to access the back-end server via the API portion through a computer network;

receive, from the client portion of the P2P module from a first client device, media in the form of a photo, a video or an audio file;

generate, by executing instructions of the P2P module, a listing for a household good or service to be offered for rent in the peer to peer marketplace based on information extracted from the received media and other data, wherein a household good or service does not include a vehicle or a dwelling, wherein the listing includes a rental cost, a category, a length of rental including dates of availability, and one or more of (i) a name of the household good or service for rent, (ii) a description of the household good or service for rent, (iii) media related to the household good or service for rent, (iv) a location of the household good or service for rent, or (v) a subcategory, and wherein the listing category can be one of an exchange or a skill share;

generate, by executing instructions of the P2P module, an insurance policy quote for an insurance policy to cover a rental transaction of the household good or service offered in the listing, wherein generating the insurance policy quote includes:
  analyzing data related to the household good or service offered in the listing,
  comparing the received listing to one or more similar listings in a listing repository maintained by the insurance provider, wherein the one or more similar listings are for similar household goods or services as the household good or service from the received listing, and
  automatically deducting the insurance policy from the rental cost of the listing;

store the listing in the listing repository maintained by the insurance provider communicatively coupled to the P2P module on the back-end server;

receive from the client portion of the P2P module from a second client device a search category;

determine, by the P2P module, one or more listings in the listing repository are pertinent by: (i) comparing a location of the second client device to the location of the household good or service for rent of each of the one more listings, and (ii) comparing the category of each listing to the received search category;

present, via a user interface on the client portion of the P2P module on the second client device, the one or more determined pertinent listings; and receive the rental transaction of one or more of the determined pertinent listings from the client portion of the P2P module on the second client device, wherein receiving the rental transaction includes receiving a payment of the rental cost which includes the cost of the insurance policy to cover the rental transaction, wherein the insurance policy of the rental transaction is provided by the insurance provider; and automatically send a notification of the rental transaction including a payment to the client portion of the P2P module on the first client device.

12. The tangible computer-readable medium of claim 11, wherein the listing further includes a username or a star rating, and wherein the media related to the household good or service for rent includes one or more of a photo, a video, or an audio file.

13. The tangible computer-readable medium of claim 11, wherein a listing can be a wanted listing.

14. The tangible computer-readable medium of claim 11, further comprising receiving, via a computer network from the client portion of the P2P module from the first client device, a login to identify a customer profile to be associated with the listing.

* * * * *